(12) United States Patent
Gao et al.

(10) Patent No.: US 9,920,160 B2
(45) Date of Patent: Mar. 20, 2018

(54) METHOD FOR SYNTHESIS OF POLYMER CONTAINING MULTIPLE EPOXY GROUPS

(71) Applicant: ZHEJIANG UNIVERSITY, Hangzhou, Zhejiang (CN)

(72) Inventors: Chao Gao, Zhejiang (CN); Yaochen Zheng, Zhejiang (CN); Li Peng, Zhejiang (CN); Shengying Cai, Zhejiang (CN); Zhulin Weng, Zhejiang (CN)

(73) Assignee: ZHEJIANG UNIVERSITY, Hangzhou, Zhejiang (CN)

( * ) Notice: Subject to any disclaimer, the term of this patent is extended or adjusted under 35 U.S.C. 154(b) by 0 days.

(21) Appl. No.: 15/305,090

(22) PCT Filed: Apr. 29, 2015

(86) PCT No.: PCT/CN2015/077818
§ 371 (c)(1),
(2) Date: Oct. 18, 2016

(87) PCT Pub. No.: WO2016/033984
PCT Pub. Date: Mar. 10, 2016

(65) Prior Publication Data
US 2017/0044304 A1 Feb. 16, 2017

(30) Foreign Application Priority Data
Sep. 3, 2014 (CN) .......................... 2014 1 0444760

(51) Int. Cl.
*C08G 59/02* (2006.01)
*C08G 59/32* (2006.01)

(52) U.S. Cl.
CPC ....... *C08G 59/022* (2013.01); *C08G 59/3209* (2013.01); *C08G 59/3263* (2013.01)

(58) Field of Classification Search
CPC .............. C08G 59/022; C08G 59/3209; C08G 59/3263; C08F 2/50
See application file for complete search history.

(56) References Cited

U.S. PATENT DOCUMENTS

| 4,104,283 A | 8/1978 | Hickner |
| 4,835,310 A | 5/1989 | Wirth et al. |
| 5,621,062 A | 4/1997 | Castellucci et al. |

FOREIGN PATENT DOCUMENTS

DE 232057 1/1986

OTHER PUBLICATIONS

Klemm, machine English translation of DD 232057 (pub. May 15, 1986).*

* cited by examiner

*Primary Examiner* — Michael Pepitone
*Assistant Examiner* — Jessica Roswell

(57) ABSTRACT

A method for a synthesis of a polymer containing multiple epoxy groups includes steps of: under protection of nitrogen or argon, with a photosensitive free radical initiator under an ultraviolet light irradiation, initiating a mixture of a dithiol compound and alkynyl glycidyl ether or other alkynyl-containing compounds to proceed a thiol-yne polymerization, so as to obtain the polymer. The number of the epoxy groups is able to be adjusted through changing a type of a dithiol monomer, a mixing ratio of the dithiol monomer, and a mixing ratio between the alkynyl glycidyl ether and other alkynyl compounds. The present invention has advantages of: fast reaction, convenient process, easy post-processing, a large number of the epoxy groups, and adjustable and controllable content. The obtained polymer has a wide potential application in fields of coating, adhesive, ink, (Continued)

Chemical shift (ppm)

encapsulating material, resin for composite material, additive, high performance material, function material, and so on.

1 Claim, 2 Drawing Sheets

METHOD FOR SYNTHESIS OF POLYMER CONTAINING MULTIPLE EPOXY GROUPS

CROSS REFERENCE OF RELATED APPLICATION

This is a U.S. National Stage under 35 U.S.C 371 of the International Application PCT/CN2015/077818, filed Apr. 29, 2015, which claims priority under 35 U.S.C. 119(a-d) to CN 201410444760.1, filed Sep. 3, 2014.

BACKGROUND OF THE PRESENT INVENTION

Field of Invention

The present invention relates to a method for a synthesis of a polymer containing multiple functional groups, and more particularly to a method for a synthesis of a polymer containing multiple epoxy groups. The polymer containing the multiple epoxy groups contains thioether bonds and has an average molecular weight larger than 300 g/mol.

Description of Related Arts

The polymer containing multiple epoxy groups is a type of multifunctional polymer containing multiple highly-active epoxy groups. The epichlorohydrin which is catalyzed by the alkali reacts with the phenolic compound, and the prepared epoxy resin generally has a relatively high viscosity. During synthesis, the generated sodium chloride is required to be removed through water washing several times. In the epoxy resin, a small number of organic chlorines and inorganic chlorine ions still exist, causing a decreased electrical performance of the epoxy resin part. It is feasible to prepare the epoxy resin through hydrogenating the unsaturated olefin. The type of the polymer containing the multiple epoxy groups does not contain chlorine elements and has a good electrical performance. The type of the cycloaliphatic epoxy compound has a low reactivity, the acid anhydride compound is generally adopted to serve as a curing agent, and a relatively high curing temperature is required to initiate a cross-linking reaction. The polyglycidyl methacrylate is an epoxy resin containing multiple epoxy groups. The epoxy groups are connected with the ester groups which are easily hydrolysable, leading to a poor chemical stability. Moreover, the polyglycidyl methacrylate is solid at a room temperature, and, during using, it is required to add the organic solvent into the polyglycidyl methacrylate, so as to improve the workability. Thus, compared with the conventional epoxy resins, the polymer containing the multiple epoxy groups, prepared by the present invention, has a relatively low intrinsic viscosity, flexible polythioether main chains and a great number of the highly-active epoxy groups. The polymer is able to be widely applied as the matrix of advance coating, adhesive, composite materials and so on. Until now, how to prepare the polymer containing the multiple epoxy groups with fast speed, simpleness, convenience, and high yield is still a challenging problem.

SUMMARY OF THE PRESENT INVENTION

An object of the present invention is to provide a method for a synthesis of a polymer containing multiple epoxy groups, so as to solve problems in conventional epoxy resin synthesis methods. The polymer containing the multiple epoxy groups contains thioether bonds and has an average molecular weight larger than 300 g/mol.

Technical solutions of the present invention are described as follows.

A method for a synthesis a polymer containing multiple epoxy groups comprises steps of:

under protection of nitrogen or argon, successively adding 1 mole of substance A, 0.5-10 moles of solvent, 0.9-1.1 moles of substance B, and 0.005-0.05 moles of photosensitive free radical initiator into a reactor; irradiating with an ultraviolet light for 0.5-4.0 hours; and, after precipitating, separating, and drying, obtaining the polymer containing the multiple epoxy groups; wherein:

the substance A is obtained through mixing at least one member selected from a group consisting of 1,3-propanedithiol, 1,4-butanedithiol, 1,5-pentanedithiol, 1,6-hexanedithiol, 1,8-octanedithiol, 3,6-dioxa-1,8-octanedithiol, bis(2-mercaptoethyl) ether, butylene glycol bis(3-mercaptopropionate), 2,3-dimercapto-1-propanol and 1,4-dithiothreitol in any proportion; and the substance B is alkynyl glycidyl ether or a mixture of the alkynyl glycidyl ether and a substance C; and, the substance C is obtained through mixing at least one member selected from a group consisting of 1-octyne, 1-hexyne, undecyne, hexadecyne, propyl cyclohexyl pentyne, 4-ethylphenylacetylene, propylphenylacetylene, butylphenylacetylene, ethyl cyclohexyl phenyl acetylene, butyl cyclohexyl phenyl acetylene, pentylphenylacetylene, pentyl cyclohexyl phenyl acetylene, dimethylphenylacetylene, 3,3-dimethylacetylene, 3-aminophenylacetylene, butynol, cyanoacetylene, pentyloxyphenylacetylene, 3-hydroxy-1-heptyne, 3-ethyl-3-hydroxyheptyne, phenyl propargyl sulfide, 5-hydroxypentyne, diethylpentyne, and ethyl propargyl ether in any proportion.

When the substance B is a mixture of a fluorescent compound containing alkynyl and the substance C, it is feasible to mix the fluorescent compound containing the alkynyl and the substance C in any proportion.

The photosensitive free radical initiator is obtained through mixing at least one member selected from a group consisting of benzoin dimethyl ether, 1-hydroxycyclohexyl phenyl ketone, benzophenone, 4-chlorobenzophenone, 4-methylbenzophenone, 4-phenylbenzophenone, isopropylthioxanthone, 2-hydroxy-2-methylpropiophenone, 2-methyl-4-(methylthio)-2-morpholinopropiophenone, methyl phenylglyoxylate, methyl 2-benzoylbenzoate, 2-ethylhexyl 4-(dimethylamino)benzoate, ethyl 4-(N,N-dimethylamino)benzoate, phenylbis(2,4,6-trimethylbenzoyl)phosphine oxide, diphenyl(2,4,6-trimethylbenzoyl)phosphine oxide, ethyl phenyl(2,4,6-trimethylbenzoyl)phosphinate, a mixture of the benzophenone and the 1-hydroxycyclohexyl phenyl ketone with a mass ratio of 1:1, and a mixture of the 1-hydroxycyclohexyl phenyl ketone and the 2-hydroxy-2-methylpropiophenone with a mass ratio of 1:4 in any proportion.

The solvent is obtained through mixing at least one member selected from a group consisting of methylbenzene, benzene, chloroform, dichloromethane, tetrahydrofuran, 1,4-dioxane, ethyl acetate, butyl acetate, N-methylpyrrolidone, N,N-dimethylformamide, and N,N-dimethylacetamide in any proportion.

The present invention has following beneficial effects.

The present invention adopts a strategy of thiol-yne polymerization. Under an initiation effect of free radicals, the thiol successively proceeds an addition reaction with the alkynyl for two times, so as to obtain the polymer containing the multiple epoxy groups and the thioether bonds. A molecular weight, a molecular structure, and a content of epoxy groups of a product are able to be flexible adjusted and controlled. Compared with prior arts, the preparation method provided by the present invention has obvious advantages of: utilizing characteristics of high efficiency and fast speed of the thiol-yne polymerization, simple and convenient process, wide application scope, easy processing after producing, simple operation, strong controllability, and high yield. The method provided by the present invention is groundbreaking for a method for a synthesis of a polymer containing multiple epoxy groups with fast speed, simpleness, convenience, and high efficiency. The obtained polymer containing the great number of the epoxy groups has a wide application prospect in fields of coating, adhesive, ink, encapsulating material, resin for composite material, additive, high performance material, function material, and so on.

DETAILED DESCRIPTION OF THE PREFERRED EMBODIMENT

A principle of the present invention is to initiate a thiol-yne polymerization by free radicals, so as to obtain a multifunctional polymer containing a great number of epoxy groups and thioether bonds.

Following examples are for further illustrating the present invention and not intended to be limiting.

EXAMPLE 1

Under protection of nitrogen or argon, 1,3-propanedithiol (2.16 g, 20 mmol), alkynyl glycidyl ether (2.24 g, 20 mmol), 0.4 mmol of photosensitive free radical initiator which was embodied to be benzoin dimethyl ether (102.5 mg) herein, and 100 mmol of N-methylpyrrolidone were successively added into a reactor. Under a room temperature, through irradiating with an ultraviolet light, a polymerization reaction lasted for 3.5 hours. After precipitating, separating, and drying, a polymer containing multiple epoxy groups was obtained (with a number-average molecular weight of 6100, a weight-average molecular weight of 9200, and a molecular weight distribution coefficient of 1.52).

Figure 1:
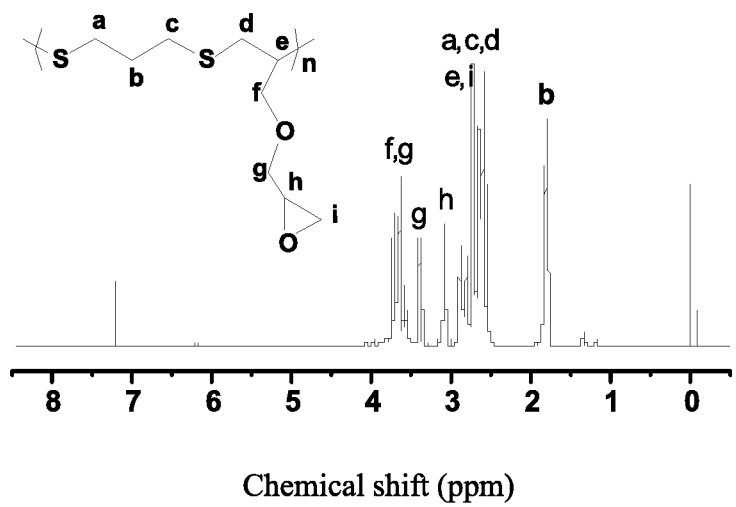
FIG. 1 is a $^1$H nuclear magnetic resonance spectroscopy of a polymer containing multiple epoxy groups which is synthesized by 1,3-propanedithiol and alkynyl glycidyl ether according to a first example of the present invention, showing signals (2.5-2.8 ppm) of hydrocarbon protons connected by a thioether bond and signals (3.1 ppm and 3.4 ppm) of hydrocarbon protons in a structure of the glycidyl ether.
Figure 3:
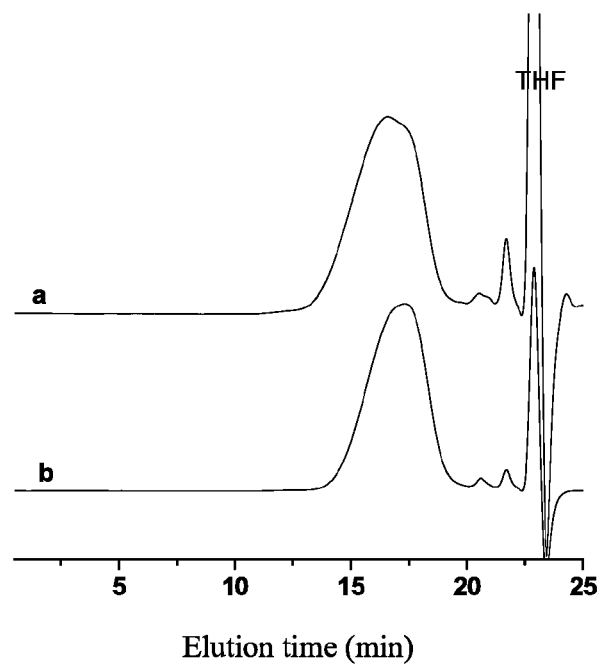
FIG. 3 shows a gel permeation chromatography (GPC) curve (curve "a") of the polymer containing the multiple epoxy groups which is synthesized by the 1,3-propanedithiol and the alkynyl glycidyl ether according to the first example of the present invention and a GPC curve (curve "b") of the polymer containing the multiple epoxy groups which is synthesized by the 2,3-dimercapto-1-propanol and the alkynyl glycidyl ether according to the second example of the present invention.
Figure 4:
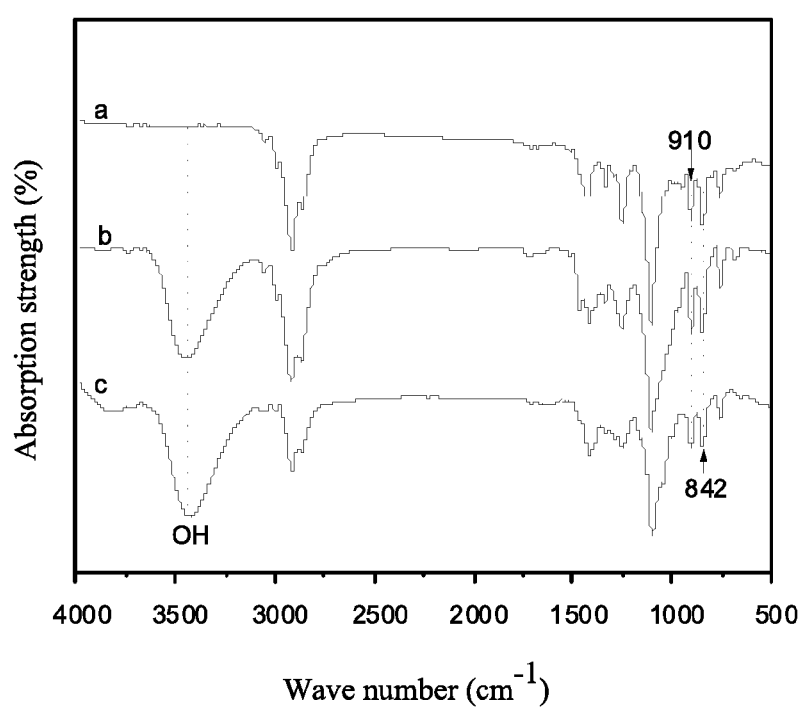
FIG. 4 shows an infrared spectroscopy (curve "a") of the polymer containing the multiple epoxy groups which is synthesized by the 1,3-propanedithiol and the alkynyl glycidyl ether according to the first example of the present invention, an infrared spectroscopy (curve "b") of the polymer containing the multiple epoxy groups which is synthesized by the 2,3-dimercapto-1-propanol and the alkynyl glycidyl ether according to the second example of the present invention, and an infrared spectroscopy (curve "c") of a polymer containing multiple epoxy groups which is synthesized by 1,4-threitol and alkynyl glycidyl ether according to a sixth example of the present invention, showing an obvious signal (3440 cm$^{-1}$) of a hydroxy group and obvious signals (910 cm$^{-1}$ and 842 cm$^{-1}$) of the epoxy groups.

FIG. 1 is a $^1$H nuclear magnetic resonance spectroscopy of the polymer containing the multiple epoxy groups which is synthesized by the 1,3-propanedithiol and the alkynyl glycidyl ether according to the first example of the present invention, showing obvious signals (2.5-2.8 ppm) of hydrocarbon protons connected by a thioether bond and obvious signals (3.1 ppm and 3.4 ppm) of hydrocarbon protons in a structure of the glycidyl ether. A curve "a" in FIG. 3 is a molecular weight distribution curve of the polymer. A curve "a" in FIG. 4 shows an infrared spectroscopy of the polymer, which shows obvious signals (910 cm$^{-1}$ and 842 cm$^{-1}$) of the epoxy groups, illustrating that a great number of the epoxy groups exist in a product.

EXAMPLE 2

Under protection of nitrogen or argon, 2,3-dimercapto-1-propanol (2.76 g, 20 mmol), alkynyl glycidyl ether (2.02 g, 18 mmol), 1.90 mmol of photosensitive free radical initiator which was embodied to be benzoin dimethyl ether (487.0 mg) herein, and 100 mmol of 1,4-dioxane were successively added into a reactor. Under a room temperature, through irradiating with an ultraviolet light, a polymerization reaction lasted for 4.0 hours. After precipitating, separating, and drying, a polymer containing multiple epoxy groups was obtained (with a number-average molecular weight of 4900, a weight-average molecular weight of 7100, and a molecular weight distribution coefficient of 1.44).

Figure 2:
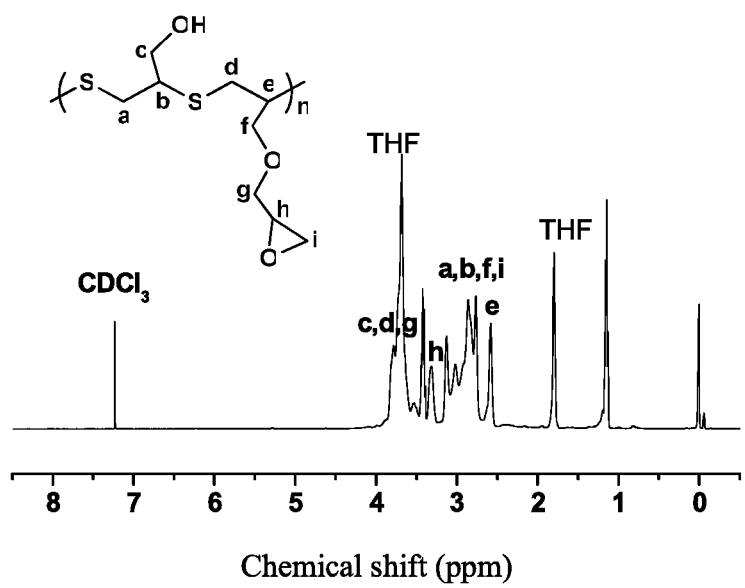
FIG. 2 is a $^1$H nuclear magnetic resonance spectroscopy of a polymer containing multiple epoxy groups which is synthesized by 2,3-dimercapto-1-propanol and alkynyl glycidyl ether according to a second example of the present invention, showing signals (2.5-3.0 ppm) of hydrocarbon protons connected by a thioether bond and signals (3.3-3.7 ppm) of hydrocarbon protons in a structure of the glycidyl ether.

FIG. 2 is a $^1$H nuclear magnetic resonance spectroscopy of the polymer containing the multiple epoxy groups which is synthesized by the 2,3-dimercapto-1-propanol and the alkynyl glycidyl ether according to the second example of the present invention, showing obvious signals (2.5-3.0 ppm) of hydrocarbon protons connected by a thioether bond and obvious signals (3.3-3.7 ppm) of hydrocarbon protons in a structure of the glycidyl ether. A curve "b" in FIG. 3 is a molecular weight distribution curve of the polymer. A curve "b" in FIG. 4 shows an infrared spectroscopy of the polymer, which shows an obvious signal (3440 cm$^{-1}$) of a hydroxy group and obvious signals (910 cm$^{-1}$ and 842 cm$^{-1}$) of the epoxy groups, illustrating that a great number of the hydroxy groups and the epoxy groups exist in a product.

EXAMPLE 3

Under protection of nitrogen or argon, 3,6-dioxa-1,8-octanedithiol (3.64 g, 20 mmol), alkynyl glycidyl ether (2.464 g, 22 mmol), 0.21 mmol of photosensitive free radical initiator which was embodied to be 2-hydroxy-2-methylpropiophenone (34.5 mg) herein, and 21 mmol of 1,4-dioxane were successively added into a reactor. Under a room temperature, through irradiating with an ultraviolet light, a polymerization reaction lasted for 0.5 hours. After precipitating, separating, and drying, a polymer containing multiple epoxy groups was obtained.

EXAMPLE 4

Under protection of nitrogen or argon, 1,8-octanedithiol (3.56 g, 20 mmol), alkynyl glycidyl ether (2.24 g, 20 mmol), 0.8 mmol of photosensitive free radical initiator which was embodied to be 2-hydroxy-2-methylpropiophenone (131.4 mg) herein, and 100 mmol of tetrahydrofuran were successively added into a reactor. Under a room temperature, through irradiating with an ultraviolet light, a polymerization reaction lasted for 4.0 hours. After precipitating, separating, and drying, a polymer containing multiple epoxy groups was obtained.

EXAMPLE 5

Under protection of nitrogen or argon, 1,8-octanedithiol (3.56 g, 20 mmol), alkynyl glycidyl ether (2.13 g, 19 mmol), 0.975 mmol of photosensitive free radical initiator which was embodied to be 2-hydroxy-2-methylpropiophenone (160.1 mg) herein, and 60 mmol of trichloromethane were successively added into a reactor. Under a room temperature, through irradiating with an ultraviolet light, a polymerization reaction lasted for 3.0 hours. After precipitating, separating, and drying, a polymer containing multiple epoxy groups was obtained.

EXAMPLE 6

Under protection of nitrogen or argon, 1,4-threitol (3.08 g, 20 mmol), alkynyl glycidyl ether (2.24 g, 20 mmol), 1.0 mmol of photosensitive free radical initiator which was embodied to be 2-hydroxy-2-methylpropiophenone (164.2 mg) herein, and 100 mmol of butyl acetate were successively added into a reactor. Under a room temperature, through irradiating with an ultraviolet light, a polymerization reaction lasted for 3.5 hours. After precipitating, separating, and drying, a polymer containing multiple epoxy groups was obtained.

A curve "c" in FIG. 4 shows an infrared spectroscopy of the polymer, which shows an obvious signal (3440 cm$^{-1}$) of a hydroxy group and obvious signals of (910 cm$^{-1}$ and 842 cm$^{-1}$) of the epoxy groups, illustrating that a great number of the hydroxy groups and the epoxy groups exist in a product.

EXAMPLE 7

Under protection of nitrogen or argon, 1,3-propanedithiol (1.08 g, 10 mmol), 1,8-octanedithiol (1.78 g, 10 mmol), alkynyl glycidyl ether (2.13 g, 19 mmol), 0.975 mmol of photosensitive free radical initiator which was embodied to be 2-hydroxy-2-methylpropiophenone (160.1 mg) herein, and 75 mmol of N,N-dimethylacetamide were successively added into a reactor. Under a room temperature, through irradiating with an ultraviolet light, a polymerization reaction lasted for 3.0 hours. After precipitating, separating, and drying, a polymer containing multiple epoxy groups was obtained.

EXAMPLE 8

Under protection of nitrogen or argon, 1,3-propanedithiol (1.08 g, 10 mmol), 1,8-octanedithiol (1.78 g, 10 mmol), alkynyl glycidyl ether (2.13 g, 19 mmol), 1.95 mmol of photosensitive free radical initiator which was embodied to be benzoin dimethyl ether (499.8 mg) herein, and 120 mmol of N,N-dimethylformamide were successively added into a reactor. Under a room temperature, through irradiating with an ultraviolet light, a polymerization reaction lasted for 3.0 hours. After precipitating, separating, and drying, a polymer containing multiple epoxy groups was obtained.

EXAMPLE 9

Under protection of nitrogen or argon, 1,3-propanedithiol (1.08 g, 10 mmol), 2,3-dimercapto-1-propanol (1.38 g, 10 mmol), alkynyl glycidyl ether (2.24 g, 20 mmol), 1.00 mmol of photosensitive free radical initiator which was embodied to be 2-hydroxy-2-methylpropiophenone (164.2 mg) herein, 60 mmol of 1,4-dioxane, and 30 mmol of N,N-dimethylformamide were successively added into a reactor. Under a room temperature, through irradiating with an ultraviolet light, a polymerization reaction lasted for 3.0 hours. After precipitating, separating, and drying, a polymer containing multiple epoxy groups was obtained.

EXAMPLE 10

Under protection of nitrogen or argon, 1,3-propanedithiol (2.16 g, 20 mmol), alkynyl glycidyl ether (2.24 g, 20 mmol), 1 mol % of benzoin dimethyl ether (51.3 mg), 1.5 mol % of 2-hydroxy-2-methylpropiophenone (49.3 mg), 60 mmol of 1,4-dioxane, and 30 mmol of N,N-dimethylformamide were successively added into a reactor. Under a room temperature, through irradiating with an ultraviolet light, a polymerization reaction lasted for 3.5 hours. After precipitating, separating, and drying, a polymer containing multiple epoxy groups was obtained.

EXAMPLE 11

Under protection of nitrogen or argon, 1,3-propanedithiol (1.08 g, 10 mmol), 1,8-octanedithiol (1.78 g, 10 mmol), alkynyl glycidyl ether (2.24 g, 20 mmol), 2.5 mol % of photosensitive free radical initiator which was embodied to be 0.40 mmol of benzoin dimethyl ether (102.5 mg) herein, 90 mmol of 1,4-dioxane, and 30 mmol of methylbenzene were successively added into a reactor. Under a room temperature, through irradiating with an ultraviolet light, a polymerization reaction lasted for 3.5 hours. After precipitating, separating, and drying, a polymer containing multiple epoxy groups was obtained.

EXAMPLE 12

Under protection of nitrogen or argon, 1,3-propanedithiol (1.62 g, 15 mmol), 1,5-pentanedithiol (0.68 g, 5 mmol), alkynyl glycidyl ether (1.12 g, 10 mmol), 1-octyne (1.10 g, 10 mmol), 0.40 mmol of photosensitive free radical initiator which was embodied to be benzoin dimethyl ether (102.5 mg) herein, and 100 mmol of xylene were successively added into a reactor. Under a room temperature, through irradiating with an ultraviolet light, a polymerization reaction lasted for 3.5 hours. After precipitating, separating, and drying, a polymer containing multiple epoxy groups was obtained.

EXAMPLE 13

Under protection of nitrogen or argon, 1,3-propanedithiol (1.08 g, 10 mmol), 1,5-pentanedithiol (1.36 g, 10 mmol), alkynyl glycidyl ether (1.12 g, 10 mmol), 1-hexyne (0.82 g, 10 mmol), 0.50 mmol of 2-hydroxy-2-methylpropiophenone (82.1 mg), 120 mmol of xylene, and 30 mmol of isopropanol were successively added into a reactor. Under a room temperature, through irradiating with an ultraviolet light, a polymerization reaction lasted for 4.0 hours. After precipitating, separating, and drying, a polymer containing multiple epoxy groups was obtained.

EXAMPLE 14

Under protection of nitrogen or argon, 3,6-dioxa-1,8-octanedithiol (1.82 g, 10 mmol), 1,5-pentanedithiol (0.68 g, 5 mmol), alkynyl glycidyl ether (1.12 g, 10 mmol), 1-hexyne (0.41 g, 5 mmol), 0.45 mmol of 2-hydroxy-2-methylpropiophenone (73.9 mg), 360 mmol of 1,4-dioxane, and 40 mmol of butyl acetate were successively added into a reactor. Under a room temperature, through irradiating with an ultraviolet light, a polymerization reaction lasted for 3.0 hours. After precipitating, separating, and drying, a polymer containing multiple epoxy groups was obtained.

EXAMPLE 15

Under protection of nitrogen or argon, 1,3-propanedithiol (1.08 g, 10 mmol), 3,6-dioxa-1,8-octanedithiol (1.82 g, 10 mmol), alkynyl glycidyl ether (0.56 g, 5 mmol), 1-octyne (1.65 g, 15 mmol), 0.50 mmol of photosensitive free radical initiator which was embodied to be benzoin dimethyl ether (128.2 mg) herein, and 400 mmol of tetrahydrofuran were successively added into a reactor. Under a room temperature, through irradiating with an ultraviolet light, a polymerization reaction lasted for 2.5 hours. After precipitating, separating, and drying, a polymer containing multiple epoxy groups was obtained.

EXAMPLE 16

Under protection of nitrogen or argon, 2,3-dimercapto-1-propanol (1.38 g, 10 mmol), 1,5-pentanedithiol (1.36 g, 10 mmol), alkynyl glycidyl ether (1.12 g, 10 mmol), 1-hexyne (0.62 g, 7.5 mmol), 0.60 mmol of photosensitive free radical initiator which was embodied to be benzoin dimethyl ether (153.8 mg) herein, 160 mmol of 1,4-dioxane, and 40 mmol of N,N-dimethylacetamide were successively added into a reactor. Under a room temperature, through irradiating with an ultraviolet light, a polymerization reaction lasted for 3.5 hours. After precipitating, separating, and drying, a polymer containing multiple epoxy groups was obtained.

EXAMPLE 17

Under protection of nitrogen or argon, 1,3-propanedithiol (2.16 g, 20 mmol), alkynyl glycidyl ether (2.24 g, 20 mmol), 0.4 mmol of photosensitive free radical initiator which was embodied to be benzoin dimethyl ether (102.5 mg) herein, and 100 mmol of N-methylpyrrolidone were successively added into a first reactor. Under a room temperature, through irradiating with an ultraviolet light, a polymerization reaction lasted for 3.5 hours.

Under the protection of the nitrogen or the argon, 1,3-propanedithiol (1.08 g, 10 mmol), 1,8-octanedithiol (1.78 g, 10 mmol), alkynyl glycidyl ether (2.24 g, 20 mmol), 2.5 mol % of photosensitive free radical initiator which was embodied to be 0.40 mmol of benzoin dimethyl ether (102.5 mg) herein, and 100 mmol of 1,4-dioxane were added into a second reactor. Under the room temperature, through irradiating with the ultraviolet light, a polymerization reaction lasted for 2.0 hours. Above two products were mixed with a mass ratio of 1:1; and, after precipitating, separating, and drying, a polymer containing multiple epoxy groups was obtained.

EXAMPLE 18

Under protection of nitrogen or argon, 1,8-octanedithiol (3.56 g, 20 mmol), alkynyl glycidyl ether (2.24 g, 20 mmol), 0.8 mmol of photosensitive free radical initiator which was embodied to be 2-hydroxy-2-methylpropiophenone (131.4 mg) herein, and 100 mmol of tetrahydrofuran were successively added into a first reactor. Under a room temperature, through irradiating with an ultraviolet light, a polymerization reaction lasted for 2.5 hours.

Under the protection of the nitrogen or the argon, 1,3-propanedithiol (2.16 g, 20 mmol), alkynyl glycidyl ether (2.24 g, 20 mmol), 1 mol % of benzoin dimethyl ether (51.3 mg), 1.5 mol % of 2-hydroxy-2-methylpropiophenone (49.3 mg), 60 mmol of 1,4-dioxane, and 30 mmol of N,N-dimethylformamide were successively added into a second reactor. Under a room temperature, through irradiating with the ultraviolet light, a polymerization reaction lasted for 2.5 hours. Above two products were mixed with a mass ratio of 2:1; and, after precipitating, separating, and drying, a polymer containing multiple epoxy groups was obtained.

EXAMPLE 19

Under protection of nitrogen or argon, 1,3-propanedithiol (1.08 g, 10 mmol), 1,8-octanedithiol (1.78 g, 10 mmol), alkynyl glycidyl ether (2.24 g, 20 mmol), 2.5 mol % of photosensitive free radical initiator which was embodied to be 0.40 mmol of benzoin dimethyl ether (102.5 mg) herein, 90 mmol of 1,4-dioxane, and 30 mmol of methylbenzene were successively added into a first reactor. Under a room temperature, through irradiating with an ultraviolet light, a polymerization reaction lasted for 3.0 hours.

Under the protection of the nitrogen or the argon, 2,3-dimercapto-1-propanol (2.76 g, 20 mmol), alkynyl glycidyl ether (2.02 g, 18 mmol), 1.90 mmol of photosensitive free radical initiator which was embodied to be benzoin dimethyl ether (487.0 mg) herein, and 60 mmol of 1,4-dioxane were successively added into a second reactor. Under the room temperature, through irradiating with the ultraviolet light, a polymerization reaction lasted for 3.0 hours. Above two products were mixed with a mass ratio of 1:2; and, after precipitating, separating, and drying, a polymer containing multiple epoxy groups was obtained.

EXAMPLE 20

Under protection of nitrogen or argon, 1,3-propanedithiol (1.08 g, 10 mmol), 1,8-octanedithiol (1.78 g, 10 mmol), alkynyl glycidyl ether (2.13 g, 19 mmol), 1.95 mmol of photosensitive free radical initiator which was embodied to be benzoin dimethyl ether (499.8 mg) herein, and 120 mmol of 1,4-dioxane were successively added into a first reactor. Under a room temperature, through irradiating with an ultraviolet light, a polymerization reaction lasted for 3.0 hours.

Under the protection of the nitrogen or the argon, 1,4-threitol (3.08 g, 20 mmol), alkynyl glycidyl ether (2.24 g, 20 mmol), 1.0 mmol of photosensitive free radical initiator which was embodied to be 2-hydroxy-2-methylpropiophenone (164.2 mg) herein, and 100 mmol of methylbenzene were successively added into a second reactor. Under the room temperature, through irradiating with the ultraviolet light, a polymerization reaction lasted for 3.5 hours. Above two products were mixed with a mass ratio of 1:1; and, after precipitating, separating, and drying, a polymer containing multiple epoxy groups was obtained.

The above examples are for illustrating the present invention and not intended to be limiting. Therefore, this invention includes all modifications encompassed within the spirit and scope of the following claims.

What is claimed is:

1. A method for a synthesis of a polymer containing multiple epoxy groups comprises steps of:
   under protection of nitrogen or argon, successively adding 1 mole of substance A, 0.5-10 moles of solvent, 0.9-1.1 moles of substance B, and 0.005-0.05 moles of photosensitive free radical initiator into a reactor; irradiating with an ultraviolet light for 0.5-4.0 hours; and, after precipitating, separating, and drying, obtaining the polymer containing the multiple epoxy groups; wherein:
   the substance A is obtained through mixing at least one member selected from the group consisting of 1,3-propanedithiol, 1,4-butanedithiol, 1,5-pentanedithiol, 1,6-hexanedithiol, 1,8-octanedithiol, 3,6-dioxa-1,8-octanedithiol, bis(2-mercaptoethyl) ether, butylene glycol bis (3-mercaptopropionate), 2,3-dimercapto-1-propanol and 1,4-dithiothreitol in any proportion;
   the substance B is alkynyl glycidyl ether or a mixture of the alkynyl glycidyl ether and a substance C; and, the substance C is obtained through mixing at least one member selected from the group consisting of 1-octyne, 1-hexyne, undecyne, hexadecyne, propyl cyclohexyl pentyne, 4-ethylphenylacetylene, propylphenylacetylene, butylphenylacetylene, ethyl cyclohexyl phenyl acetylene, butyl cyclohexyl phenyl acetylene, pentylphenylacetylene, pentyl cyclohexyl phenyl acetylene, dimethylphenylacetylene, 3,3-dimethylacetylene, 3-aminophenylacetylene, butynol, cyanoacetylene, pentyloxyphenylacetylene, 3-hydroxy-1-heptyne, 3-ethyl-3-hydroxyheptyne, phenyl propargyl sulfide, 5-hydroxypentyne, diethylpentyne, and ethyl propargyl ether in any proportion;
   the photosensitive free radical initiator is obtained through mixing at least one member selected from the group consisting of benzoin dimethyl ether, 1-hydroxycyclohexyl phenyl ketone, benzophenone, 4-chlorobenzophenone, 4-methylbenzophenone, 4-phenylbenzophenone, isopropylthioxanthone, 2-hydroxy-2-methylpropiophenone, 2-methyl-4-(methylthio)-2-morpholinopropiophenone, methyl phenylglyoxylate, methyl 2-benzoylbenzoate, 2-ethylhexyl 4-(dimethylamino)benzoate, ethyl 4-(N,N-dimethylamino)benzoate, phenylbis(2,4,6-trimethylbenzoyl)phosphine oxide, diphenyl(2,4,6-trimethylbenzoyl)phosphine oxide, ethyl phenyl(2,4,6-trimethylbenzoyl)phosphinate, a mixture of the benzophenone and the 1-hydroxycyclohexyl phenyl ketone with a mass ratio of 1:1, and a mixture of the 1-hydroxycyclohexyl phenyl ketone and the 2-hydroxy-2-methylpropiophenone with a mass ratio of 1:4 in any proportion; and
   the solvent is obtained through mixing at least one member selected from the group consisting of methylbenzene, benzene, chloroform, dichloromethane, tetrahydrofuran, 1,4-dioxane, ethyl acetate, butyl acetate, N-methylpyrrolidone, N,N-dimethylformamide, and N,N-dimethylacetamide in any proportion.

* * * * *